(12) United States Patent  (10) Patent No.: US 8,661,222 B2
Yaari  (45) Date of Patent: Feb. 25, 2014

(54) DATA OBJECT PROFILING DURING PROGRAM EXECUTION

(75) Inventor: Yaakov Yaari, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 13/230,859

(22) Filed: Sep. 13, 2011

(65) Prior Publication Data

US 2013/0067192 A1    Mar. 14, 2013

(51) Int. Cl.
  *G06F 12/02*    (2006.01)
(52) U.S. Cl.
  USPC .................... 711/170; 711/202; 711/E12.002
(58) Field of Classification Search
  USPC ................................. 711/202, E12.002, 170
  See application file for complete search history.

(56) References Cited

U.S. PATENT DOCUMENTS

| 7,058,785 B1* | 6/2006 | Ochotta ..................... 711/202 |
| 2001/0003822 A1* | 6/2001 | Hibi et al. .................. 709/100 |
| 2001/0047436 A1* | 11/2001 | Sexton et al. ............... 709/316 |
| 2005/0114291 A1* | 5/2005 | Becker-Szendy et al. ....... 707/1 |

\* cited by examiner

*Primary Examiner* — Mardochee Chery
(74) *Attorney, Agent, or Firm* — F. Jason Far-hodia, Esq.; Century IP Group

(57) ABSTRACT

Systems and methods for identifying objects generated during program execution are provided. In one embodiment, the method comprises examining one or more data structures that include information about allocation of memory space to one or more objects; determining address space allocated to at least one of said objects based on examining said data structure; populating a reverse object map based on the examining of the one or more data structures and the determining of the address space allocated to said objects, such that one or more addresses in memory are associated with an object instantiated during program execution; and determining identity of a target object accessed during program execution in association with a respective address, in response to evaluating the respective address against the reverse object map to find the target object.

19 Claims, 7 Drawing Sheets

DATA OBJECT PROFILING DURING PROGRAM EXECUTION

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to runtime analysis and verification in a computing environment, and more particularly to real-time object profiling.

BACKGROUND

Tracing is a common method to understand (i.e., profile) the dominant characteristics of a program code executed in a computing system. The trace is generally in form of a series of records, each referring to a point during program execution. A record typically contains the program counter address (PC) and information about content of the system registers, accessed memory addresses, operation types, and more.

Frequently, it is desirable to trace a computer implemented object during the execution of a program. In particular, it may be desirable to profile a target object when the object is addressed by an instruction of interest or at a point of interest during program execution or both. Object profiling provides for a detailed level of program tracing and may help determine optimal object placement in a system's cache, for example.

Complex and lengthy program traces are generally written to a file and are post-processed off-line. That is, the trace analysis is performed on a trace written to the file after the instruction accessing the object has been executed and often after the full execution of the program code to completion. As such, a target object's trace is, generally, not readily available at the point of execution for real-time analysis.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Systems and methods for identifying objects generated during program execution are provided. In one embodiment, the method comprises examining one or more data structures that include information about allocation of memory space to one or more objects; determining address space allocated to at least one of said objects based on examining said data structure; populating a reverse object map based on the examining of the one or more data structures and the determining of the address space allocated to said objects, such that one or more addresses in memory are associated with an object instantiated during program execution; and determining identity of a target object accessed during program execution in association with a respective address, in response to evaluating the respective address against the reverse object map to find the target object.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

Figure 1:
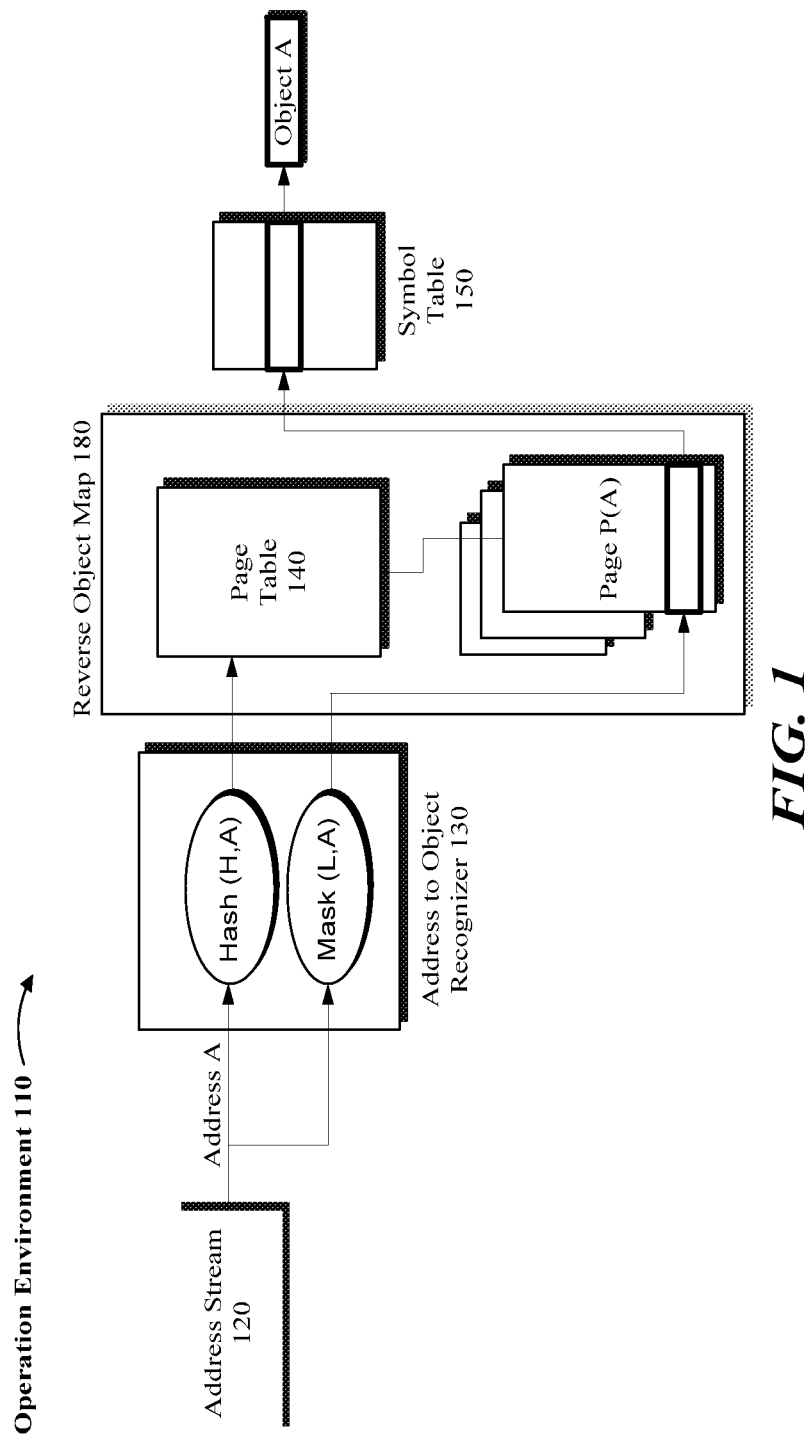
FIG. 1 illustrates an exemplary computing environment in accordance with one or more embodiments, wherein addresses in an address stream are mapped to one or more objects in real-time.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more embodiments, a scheme is implemented to profile objects accessed during the execution of program code and to determine the details about said objects in real time. To accomplish this, an input stream that includes addresses of the objects being accessed during program execution is analyzed. As provided in further detail below, the analysis may be performed on a subset of the addresses included in the input stream (e.g., by way a sampling mechanism) to reduce the overhead associated with the profiling.

Each address may be configured in two identifiable parts, for example, including the higher order bits and the lower order bits, respectively. The higher order bits may be examined (e.g., using a hash function) to detect the memory page in which the address space is allocated to an object (e.g., in virtual memory). The lower order bits may be examined to determine the offset to the locations in the detected memory page, where memory spaces are allocated to the target object.

For scalar objects, the one-to-one mapping between the object and a memory address to which the object is allocated may be determined. For example, a hashing scheme may be utilized to determine the storage address of the object. For larger objects, like arrays, or objects with complex structures (e.g., linked lists, etc.), the mapping may be many-to-one. In other words, multiple addresses on a page may be allocated to a single object. The mapping process in such scenarios may yield several pointers from the memory page to a single object.

The mapping process may involve references to one or more data structures (e.g., a symbol table, a reverse address map, etc.) that include detailed information about the objects and the location of the objects in memory, where one or more addresses on a page identify with one or more objects. An address stream associated with objects accessed during program execution may thus be examined and sampled, for example, to create an object trace, desirably in real-time, as provided in further detail below.

In one embodiment, optionally, the result of the object trace may be used to generate a temporal relationship graph (TRG) that represents with a level of detail objects being accessed in close time intervals. The graph may include each object as a node and provide an edge between two objects that are deemed to be temporally close. Heavier edges between two objects may be configured to indicate a closer temporal correlation between the objects being access. Such graphical representation may lead to discovery of interesting objects or relationships between objects, desirably in real time.

Referring to FIG. 1, the general concepts disclosed above are discussed in further detail with reference to one or more embodiments. As shown, in an exemplary operation environment 110, an address stream 120 is generated that includes addresses of objects being accessed during program execution. The address stream 120 is fed to an address to object recognizer (ATOR) 130. Using one or more hashing mechanisms, ATOR 130 determines the memory page and page location(s) to which an inputted address belongs. Based on information in a page table 140 and symbol table 150 the object associated with the inputted address is identified.

A page table is a data structure used in, for example, a virtual memory system in a computing environment to store the mapping relationship between virtual memory addresses and physical memory addresses to which an object is allocated. Virtual memory addresses may be unique to the accessing process. Physical memory addresses are unique to the hardware implemented memory locations (e.g., Random Access memory (RAM), etc.). A symbol table is a data structure used by the system compiler or interpreter, where each identifier in the program code is associated with information relating to its declaration or appearance in the code, such as its type, scope level and sometimes its location.

Figure 2:
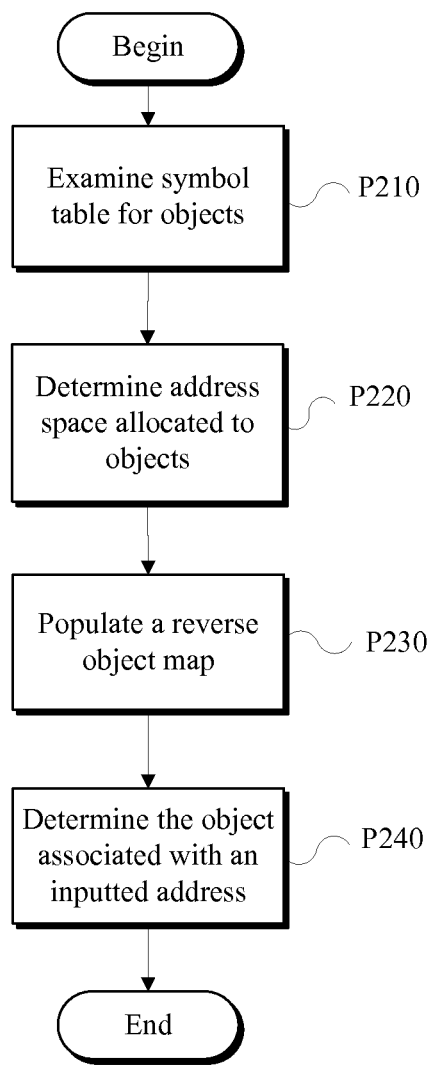
FIG. 2 is an exemplary flow diagram of a method of mapping addresses to objects in the exemplary computing environment shown in FIG. 1, in accordance with one embodiment.

Referring to FIGS. 1 and 2, the system disclosed in FIG. 1 at an initialization stage examines symbol table 150 generated for a program code under test for objects declared or instantiated by the program during execution (P210). Symbol table 150 may include name, address, size and type information for each object. Based on examining symbol table 150, the address space allocated to objects referenced in page table 140 may be determined (P220).

It is noteworthy that, depending on implementation, the address space allocated to static objects (i.e., objects with predefined address allocations that are declared at the beginning of or prior to program execution) may be determined at the initialization stage. For the dynamic objects (i.e., objects with address allocations that take place after the beginning and during program execution), the analysis may be performed during program execution when a memory page is constructed for the dynamic object, in response to a memory allocation request for that object.

Referring back to FIG. 2, for one or more objects detected as the result of examining symbol table 150, a reverse object map (ROM) 180 may be populated (P230). During the initialization stage, ROM 180 is initialized for each of the static objects. For example, an array G of ten, 32-bit integers, with address A, would be found in ROM 180 at a page defined by $P(A)=hash(H,A)$, where the ten array elements start at offset $O=mask(L,A)$, for example (see ATOR 130 in FIG. 1). The mask function $O=mask(L,A)$ extracts L number of low order bits from address A.

In this example, addresses for each of the ten array elements may point to object G in symbol table 150. $P(A)$ is the target memory page. A is the respective address for the target object. H is the number of high order bits of A used to access page table 140, and L is the remaining low order bits used for the in-page access. For example, with 32-bit address, if H=20 and L=12, then Hash(20,A) would perform a hash function on the high-order 20 bits of A, selecting a page from page table 140. Mask(12,A) may then create an offset in the selected page, including the zero-extended low order 12 bits of A.

ROM 180 is thus used, in one implementation, to map an address space in page table 140 to an object in symbol table 150. As such, a direct association (e.g., pointer) may be established from each address in a memory page to an object instantiated during program execution, based on the content of symbol table 150 and page table 140. Accordingly, using the information in ROM 180, the association of an object with an inputted address to ATOR 130 may be determined (P240).

As provided in further detail below, ROM 180 may be configured as a page table, where each address is mapped to a page using the high-order bits (i.e., H bits) in an address inputted to ATOR 130, and where the low order bits (i.e., L bits) represent the offset in the respective page. The content of the page at that offset is a pointer to the object in symbol table 150 as shown in FIG. 1. Thus, ROM 180 provides the address-to-object mapping that indicates which object is being accessed at a point in time during execution.

In other words, a word at offset O in an accessed page P points to the object in symbol table 150 whose address A corresponds to $\{P(A),O\}$, wherein $P(A)=hash(H,A)$ and $O=mask(L,A)$. The above method, unlike the compiler-based approaches recognizes objects that the compiler cannot associate at compile-time (e.g., function parameters). Also, unlike common methods that use various sort methods, the above method maps virtual addresses to objects in real time.

By way of review, in accordance with one embodiment, address traces from execution of multiple threads in a program code may be combined to a single trace which is fed to ATOR 130. ATOR 130 sets an address A as the input address for a current object access. A is divided to high order part H and low order part L. P(A)=Hash(H, A) is used to hash the higher order bits of the address to identify the page that corresponds to address A.

In one implementation, P(A)=Hash(H,A) is looked-up in page table 140. If the result is not found in page table 140 an undefined object address is reported. Mask (L,A) is used to determine a pointer from the low order bits of address A to a location (i.e., offset) in the page that points to an object in symbol table 140.

Figure 3A:
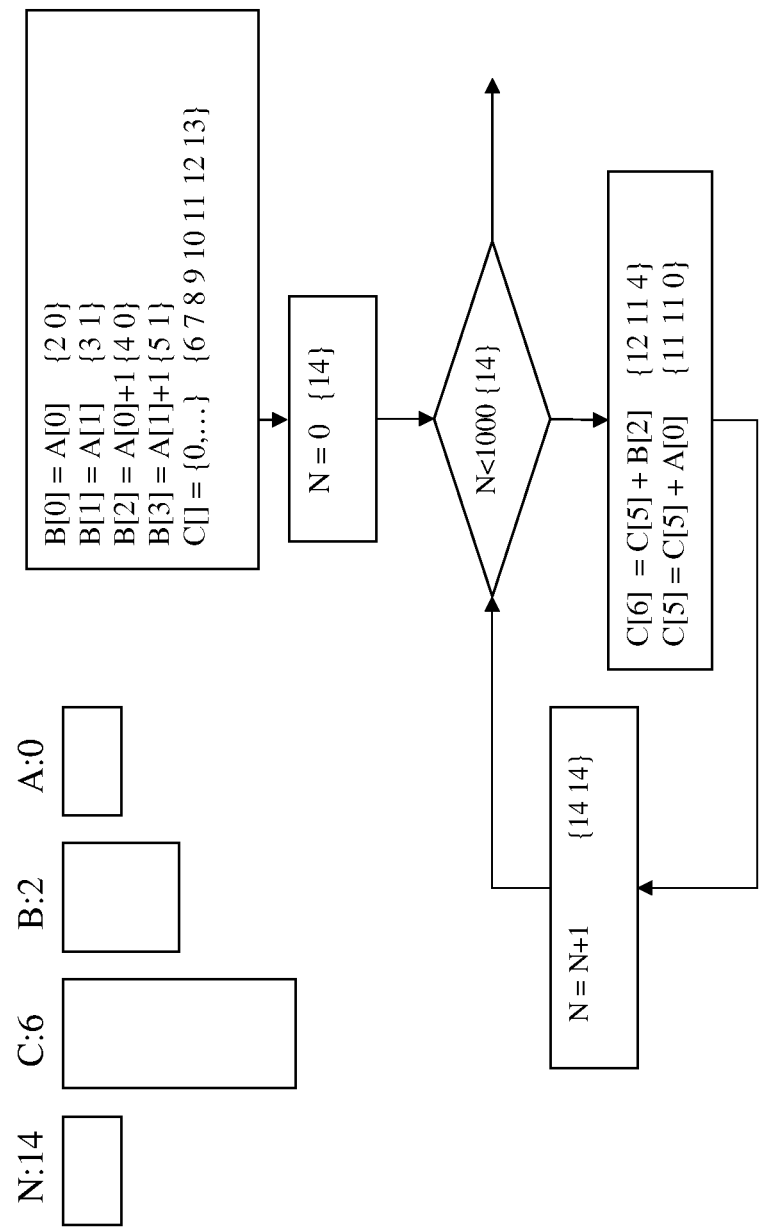
FIGS. 3A to 3C are block diagrams of an exemplary scenario showing the address space for a program under execution wherein executing instructions are mapped with addresses in an address stream, in accordance with one embodiment.
Figure 3B:
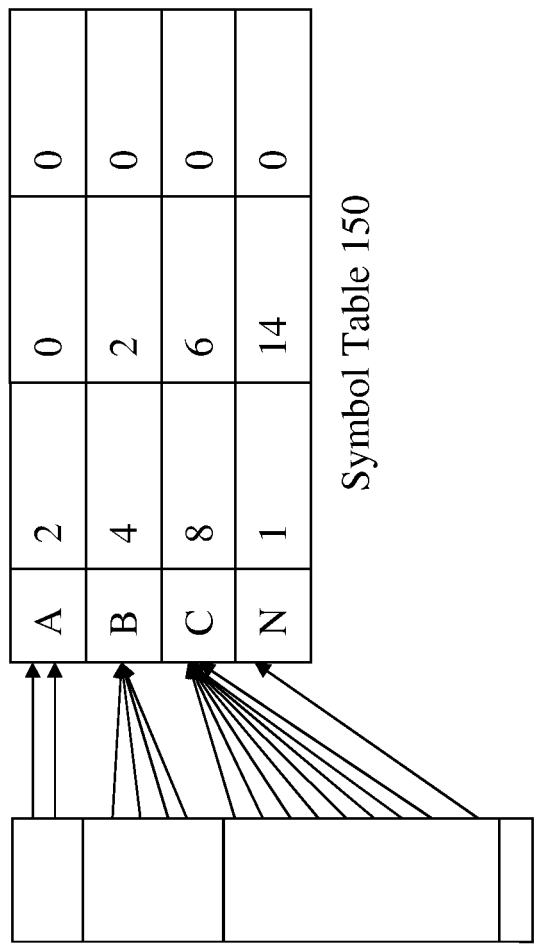
Figure 3C:
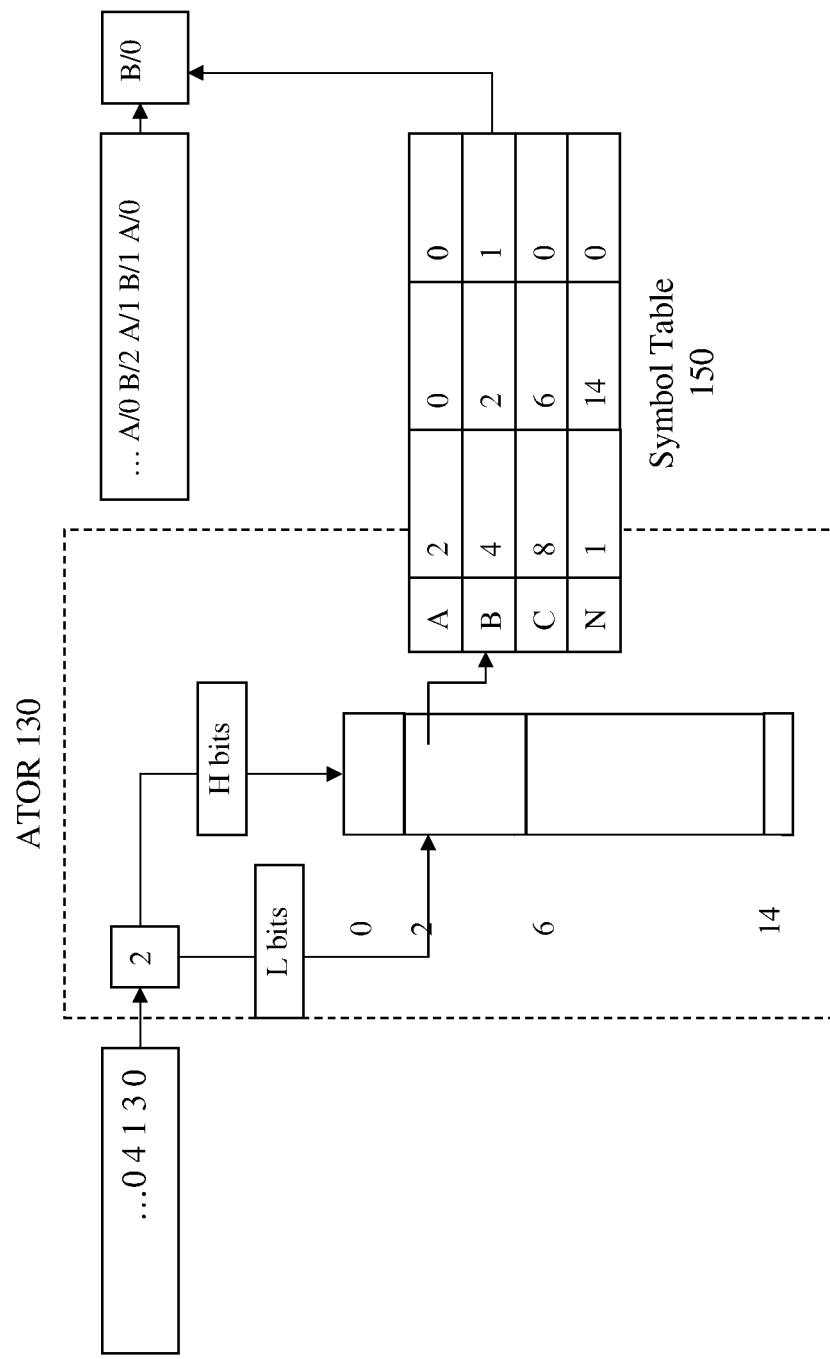

Referring to FIGS. 3A to 3C, a detailed example is provided in the following paragraphs to provide a better understanding of the disclosed features above. It is noteworthy that the provided detailed implementation below is exemplary in nature and is not to be construed as limiting the scope of the claimed subject matter to the particular details or features.

As shown in FIG. 3A, a function foo with three objects A, B, and C may be executed in a computing environment. The sizes of A, B and C are 2, 4, and 8 words respectively, and their addresses are 0, 2 and 6, respectively. The size N is 1 and its address is 14 (the addresses accessed during execution are shown in curly brackets by way of example). The resulting address stream from execution of the function may be schematically represented as follows:

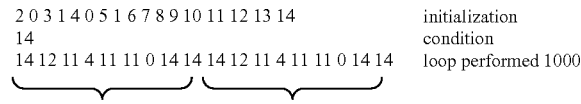

```
2 0 3 1 4 0 5 1 6 7 8 9 10 11 12 13 14         initialization
14                                              condition
14 12 11 4 11 11 0 14 14 14 12 11 4 11 11 0 14 14   loop performed 1000
```

In this example, the size of the three objects A, B and C together is 14 words and the three objects all fit within a single page which typically covers few thousand words. Referring to FIG. 3B, an entry in symbol table 150 contains the name, size, address and reference count (initially zero) for the objects. Referring to FIG. 3C, converting the address stream to an object stream is accomplished by inputting the address stream into ATOR 130, so that the oldest address comes first (i.e., graphically, a mirror picture of the stream in shown in FIG. 3A).

As shown in FIG. 3C, high-order part of the address (H bits) are used to select the page and the low order part (L bits) are used to identify the word inside the page based on the offset value indicated by the L bits. The word itself is a pointer to the object that contains the input address (e.g., address B in this example). The output object produced by ATOR 130 includes the symbol table object and also the offset within the object (e.g., separated by '/' in FIG. 3C). The offset may be determined by subtracting the object address from the input address. In the above example the offset is zero (i.e., 2−2=0).

In one embodiment, when the program code under test (e.g., as instrumented according to the above methods) terminates, a signal (e.g., using a special record in the address stream) is forwarded to a post-processor. The post-processor may be configured to output, optionally in real time, the content of symbol table 150, which contains the reference count of each object, or other post-processing structures (e.g., a temporal relationship graph) that may be used to graphically represent the temporal relationships between one or more of the detected objects during program execution.

Further, as briefly noted earlier, in some implementation, not all addresses in the input stream may be used in the reverse mapping scheme provided here. Instead, the addresses in the input stream to ATOR 130 may be sampled to reduce the overhead associated with implementing the process in real time. The sampling may be based on a K:N arrangement for each executed thread such that N samples in the stream are repeatedly ignored, and then K samples are traced. K may be smaller than N and not its divisor to avoid resonance Example values may be K=1001 and N=10,000. Based on experimentation, ratios of 1:10 to 1:100 were found to produce traces which are practically indistinguishable from the original.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
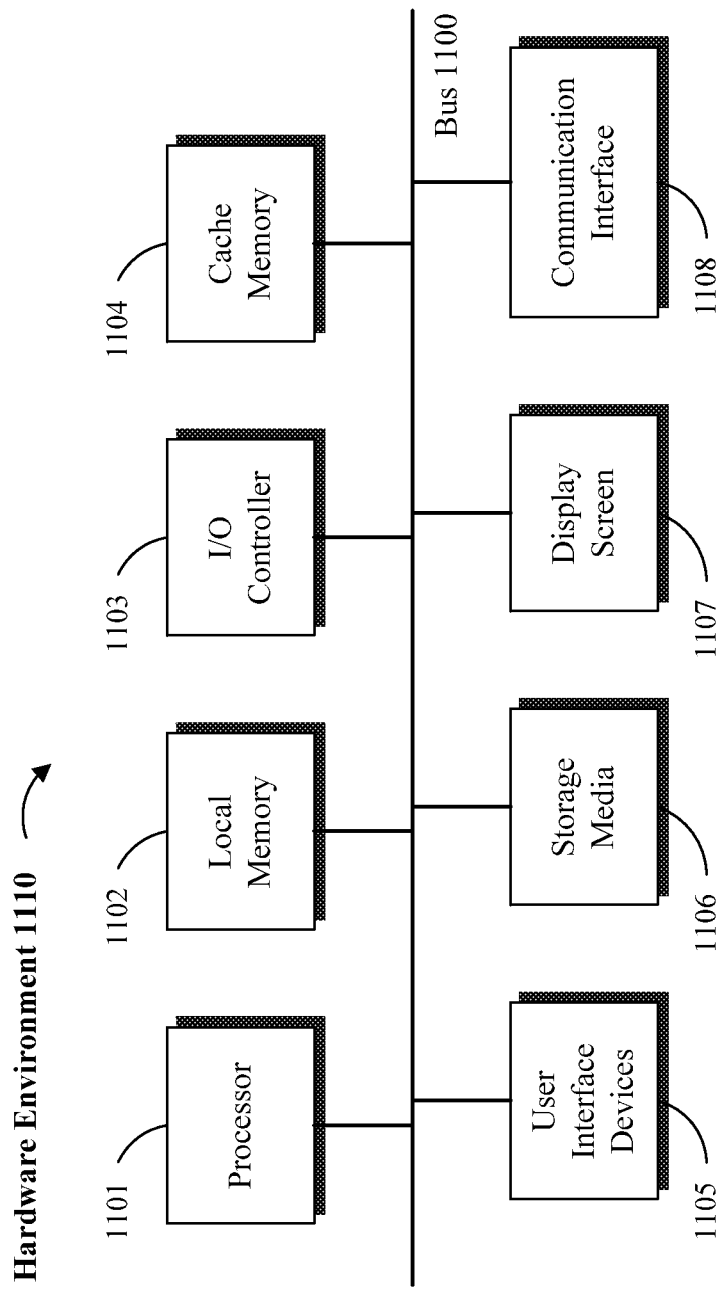
FIGS. 4A and 4B are block diagrams of hardware and software environments in which the disclosed systems and methods may operate, in accordance with one or more embodiments.
Figure 4B:
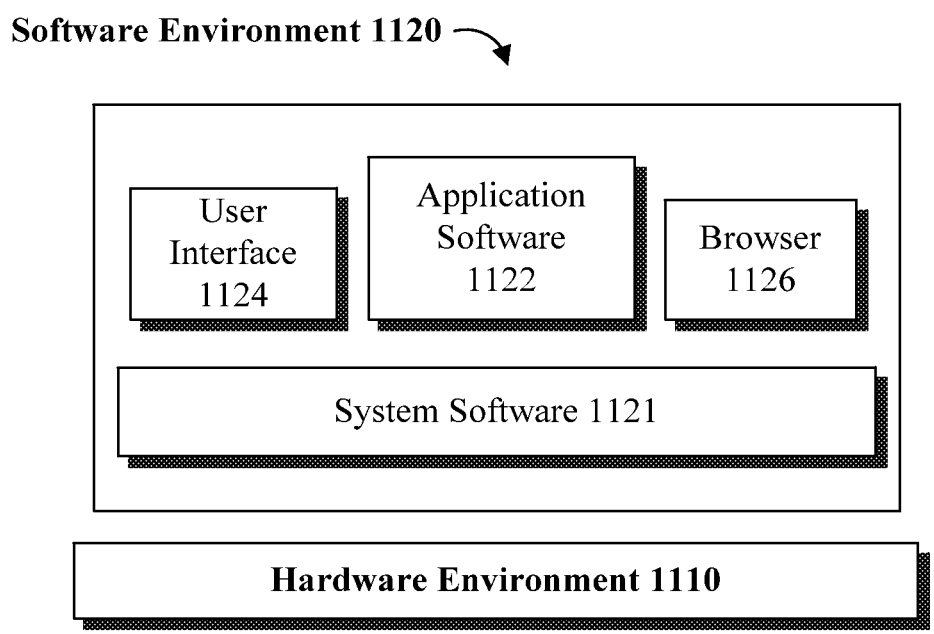

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented method for identifying objects generated during program execution, the method comprising:
    examining a data stream to determine memory addresses allocated to one or more objects instantiated or accessed during execution of a program code under test, wherein the data stream is generated by way of instrumentation of the program code to include information about allocation of memory space to the one or more objects as the program code is being executed;
    populating entries in a reverse object map based on the examining content of one or more data structures, wherein entries in the reverse object map provide an association between one or more addresses in memory pages of a computing system executing the program code and an object instantiated during the program execution,
    wherein said association is according to a correlation between address space information and object information included in the one or more data structures; and
    for a target memory address in the data stream, determining identity of a target object associated with the target memory address by evaluating the target address against the reverse object map to find the target object.

2. The method of claim 1, wherein the one or more data structures include a symbol table that identifies address space allocation for the one or more objects accessed during program execution.

3. The method of claim 2, wherein the one or more data structures include a page table that identifies one or more addresses in a memory page that are allocated to at least one of the one or more objects accessed during program execution.

4. The method of claim 3, wherein evaluating the target address for the target object comprises:
    examining a first portion of the target address to determine a target memory page in which an address space is allocated to the target object.

5. The method of claim 4, wherein evaluating the target address for the target object further comprises:
    examining a second portion of the target address to determine an offset in the target memory page, wherein the offset indicates a location in the target memory page that designates a first memory address in the address space allocated to the target object.

6. The method of claim 4, wherein the target memory page is determined based on a hash function $P(A)=hash(H,A)$, wherein $P(A)$ is the target memory page, A is the target address for the target object, and H is a hash key for the hash function.

7. The method of claim 5, wherein the offset in the target memory page is determined based on a mask function $O=mask(L,A)$, wherein O is the offset in the target memory page, A is the target address for the target object, and L is the number of low order bits used by the mask function.

8. The method of claim 6, wherein H is number of high order bits of A used to access a page table that point to the target memory page.

9. The method of claim 7, wherein the mask function extracts a number of low order bits from address A.

10. A system comprising:
one or more processors in communication with storage media and memory elements for identifying objects generated during program execution;
a logic unit for examining a data stream to determine memory addresses allocated to one or more objects instantiated or accessed during execution of a program code under test, wherein the data stream is generated by way of instrumentation of the program code to include information about allocation of memory space to the one or more objects as the program code is being executed;
a logic unit for populating entries in a reverse object map based on the examining content of one or more data structures, wherein entries in the reverse object map provide an association between one or more addresses in memory pages of a computing system executing the program code and an object instantiated during the program execution,
wherein said association is according to a correlation between address space information and object information included in the one or more data structures; and
a logic unit for determining identity of a target object associated with the target memory address by evaluating the target address against the reverse object map to find the target object.

11. The system of claim 10, wherein the one or more data structures include a symbol table that identifies address space allocation for the one or more objects accessed during program execution.

12. The system of claim 11, wherein the one or more data structures include a page table that identifies one or more addresses in a memory page that are allocated to at least one of the one or more objects accessed during program execution.

13. The system of claim 12, wherein evaluating the target address for the target object comprises:
examining a first portion of the target address to determine a target memory page in which an address space is allocated to the target object.

14. The system of claim 13, wherein evaluating the target address for the target object further comprises:
examining a second portion of the target address to determine an offset in the target memory page, wherein the offset indicates a location in the target memory page that designates a first memory address in the address space allocated to the target object.

15. A computer program product comprising a non-transient computer readable storage medium having a computer readable program, wherein the computer readable program when executed on a computer causes the computer to:
examine a data stream to determine memory addresses allocated to one or more objects instantiated or accessed during execution of a program code under test, wherein the data stream is generated by way of instrumentation of the program code to include information about allocation of memory space to the one or more objects as the program code is being executed;
populate entries in a reverse object map based on the examining content of one or more data structures, wherein entries in the reverse object map provide an association between one or more addresses in memory pages of a computing system executing the program code and an object instantiated during the program execution,
wherein said association is according to a correlation between address space information and object information included in the one or more data structures; and
determine identity of a target object associated with the target memory address by evaluating the target address against the reverse object map to find the target object.

16. The computer program product of claim 15, wherein the one or more data structures include a symbol table that identifies address space allocation for the one or more objects accessed during program execution.

17. The computer program product of claim 16, wherein the one or more data structures include a page table that identifies one or more addresses in a memory page that are allocated to at least one of the one or more objects accessed during program execution.

18. The computer program product of claim 17, wherein evaluating the target address for the target object comprises:
examining a first portion of the target address to determine a target memory page in which an address space is allocated to the target object.

19. The computer program product of claim 18, wherein evaluating the target address for the target object further comprises:
examining a second portion of the target address to determine an offset in the target memory page, wherein the offset indicates a location in the target memory page that designates a first memory address in the address space allocated to the target object.

* * * * *